(12) United States Patent
Shimbo et al.

(10) Patent No.: US 8,497,988 B2
(45) Date of Patent: Jul. 30, 2013

(54) SPECTRAL DISTRIBUTION MEASURING DEVICE

(75) Inventors: Kohei Shimbo, Yokohama (JP); Manabu Seo, Yokohama (JP); Naohiro Kamijo, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 328 days.

(21) Appl. No.: 12/879,761

(22) Filed: Sep. 10, 2010

(65) Prior Publication Data
US 2011/0063615 A1    Mar. 17, 2011

(30) Foreign Application Priority Data

Sep. 14, 2009    (JP) ................................. 2009-211436

(51) Int. Cl.
*G01J 3/28* (2006.01)

(52) U.S. Cl.
USPC .............................. 356/328; 356/71; 356/445

(58) Field of Classification Search
USPC ........................................... 356/328, 71, 445
See application file for complete search history.

(56) References Cited

U.S. PATENT DOCUMENTS

| | | | | |
|---|---|---|---|---|
| 5,162,943 A | * | 11/1992 | Komatsu et al. | 359/571 |
| 5,297,555 A | * | 3/1994 | Martens | 600/476 |
| 5,374,988 A | * | 12/1994 | Wertz et al. | 356/328 |
| 6,975,949 B2 | | 12/2005 | Mestha et al. | |
| 7,057,723 B2 | * | 6/2006 | Klock et al. | 356/328 |
| 7,671,992 B2 | | 3/2010 | Ehbets et al. | |
| 2005/0052649 A1 | | 3/2005 | Tsujita | |
| 2007/0057151 A1 | | 3/2007 | Saito et al. | |

FOREIGN PATENT DOCUMENTS

| | | |
|---|---|---|
| DE | 195 23 140 A1 | 1/1997 |
| JP | 2005-315883 A | 11/2005 |
| JP | 2008-518218 A | 5/2008 |
| WO | WO 02/50783 A1 | 6/2002 |

OTHER PUBLICATIONS

Tsumura, N., et al., "Estimation of Spectral ReflectanceS from Multi-Band Images by Multiple Regression Analysis" Optics, vol. 27, No. 7, pp. 384-391, May 2, 1998.

* cited by examiner

*Primary Examiner* — Layla Lauchman
(74) *Attorney, Agent, or Firm* — Dickstein Shapiro LLP

(57) ABSTRACT

A spectral distribution measuring device includes an illumination unit configured to illuminate white light to a surface of an object being measured; a slit array having a plurality of slits formed in alignment at equal intervals; a linear image sensor including a light receiving face having a plurality of rectangular pixels adjacently arranged in alignment and a plurality of spectral light-irradiated areas divided in each predetermined number of neighboring pixels; a plurality of areas being measured which is set on the surface of the object being measured, and reflects the light irradiated by the illumination unit to the plurality of slits; and a diffraction unit configured to diffract and disperse reflection light which is reflected from the areas being measured and has passed through each slit, the diffraction unit being disposed such that a direction where a diffraction image expands is inclined at an angle to a direction where the light receiving face expands.

13 Claims, 9 Drawing Sheets

SPECTRAL DISTRIBUTION MEASURING DEVICE

PRIORITY CLAIM

The present application is based on and claims priority from Japanese Patent Application No. 2009-211436, filed on, Sep. 14, 2009, the disclosure of which is hereby incorporated by reference in its entirety.

BACKGROUND OF THE INVENTION

1. Field of the Invention

The present invention relates to a spectral distribution measuring device which measures a spectral reflection distribution in an arbitrary position of an image printed on a surface of an image forming medium such as paper.

2. Description of the Related Art

Many image forming apparatuses such as a printer, a copier, a high-value-added complex machine and a commercial printing machine in which a communication function is added to a printer and a copier are available on the market. As a method of forming an image adapted to these image forming apparatuses, various methods are known such as an electrophotographic method, an ink jet method and a thermosensitive method. In the commercial printing field, a sheet-fed press and a continuous printing machine are increasingly becoming digitized, and many products utilizing an electrophotographic method and an ink jet method are being introduced are brought into the market.

By the fine development and the colorization of an image which is handled in these image forming apparatuses, a picture, a catalogue and an invoice can be printed at a high quality according to a personal preference. In the commercial printing field, with the fine development and the colorization of a printed image, services which are provided to consumers by advertisements have been diversified. In order to secure the accuracy of information which is provided by such services, it is necessary to secure image quality accuracy such as color reproducibility.

As a technique which secures such image quality accuracy, an electrophtographic image forming apparatus, which has a concentration sensor for detecting the concentration of toner adhered onto an intermediate transfer body and a photoreceptor before being fused, and stabilizes the amount of toner on a surface of a print by controlling the amount of toner to be supplied according to the detection result, is available on the market.

As a technique which secures accuracy of information such as personal information, an image forming apparatus which inspects a printed result is available on the market. In such an image forming apparatus, despite an image forming method, for example, a printed image is imaged by an imaging element so as to be recorded as image data, the characters of the original image and the printed image are recognized and compared by using a character recognition technique, and a difference between those images is detected by the difference between these image data.

Moreover, as a technique which secures color reproducibility, for example, an image forming apparatus, which prints a color patch for inspection on a surface of a print, measures it by a spectrometer, compares the measured value of this color and the color data of the color patch, and performs calibration according to the difference, is available on the market.

These techniques aim to control image quality fluctuation among a plurality of pages or on one page, so it is preferable to perform measurement of a spectral reflection distribution of a print with respect to an entire area of an image.

As one example of a measuring device which measures a spectral reflection distribution with respect to an entire area of an image of a print, a measuring device described in JP2008-518218A includes a plurality of scanning units to an object being measured (hereinafter, measuring object), which measures spectral reflectivity of wavelength bands different to each scanning unit.

By using these scanning units, spectral reflectivity at arbitrary points on an image of a measuring object is simultaneously measured at different wavelength bands, and colors in respective points on the image are measured over the entire area of the image.

A measuring device described in JP2005-315883A includes a scanning unit having a LED array light source in which a plurality of LEDs each having a different color is arranged. The measuring device is configured to sequentially illuminate the LED array of each color when the measuring object and the scanning unit are relatively moved, measure the reflection light from the surface of the measuring object by the illumination of different colors and estimate the spectral distribution from the measurement data.

In the measuring device of JP2008-518218A, however, when relatively moving the measuring object and a plurality of scanning units, for example, if the measuring object meanders or is inclined to a plurality of scanning units, the measuring object is displaced to each scanning unit, and it becomes difficult to align images among respective image data measured by respective scanning units. For this reason, it becomes difficult to measure the colors of the measuring object with a high accuracy.

In the measuring device of JP2005-315883A, the relative positional relationship between the measuring object and the scanning unit differs with respect to each color to be illuminated by the mistiming of the light emission of the light source of each color in scanning. For this reason, the light reflected from the different positions of the surface of the measuring object is measured by a line sensor. Therefore, color data to the same point of the measuring object can not be measured, so that it is difficult to measure the colors of the measuring object with high accuracy.

SUMMARY OF THE INVENTION

The present invention has been made in view of the above problems, and an object of the present invention is to provide a spectral distribution measuring device which can measure colors of an object being measured with high accuracy.

In order to achieve the above object, according to one embodiment of the present invention, a spectral distribution measuring device, includes: an illumination unit configured to illuminate white light to a surface of an object being measured; a slit array having a plurality of slits formed in alignment at equal intervals; a linear image sensor including a light receiving face having a plurality of rectangular pixels adjacently arranged in alignment and a plurality of spectral light-irradiated areas divided in each predetermined number of neighboring pixels; a plurality of areas being measured which is set on the surface of the object being measured, and reflects the light irradiated by the illumination unit to the plurality of slits; and a diffraction unit configured to diffract and disperse reflection light which is reflected from the areas being measured and has passed through each slit, the diffraction unit being disposed such that a direction where a diffraction image expands is inclined at an angle to a direction where the light receiving face expands, so that an irradiated area corresponding to a measuring wavelength range of each predetermined order diffraction light, except for zero order diffraction light, of the diffraction image of each dispersed reflection light on the light receiving face is irradiated to the corresponding each spectral light-irradiated area.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

DETAILED DESCRIPTION OF THE PREFERRED EMBODIMENTS

Hereinafter, embodiments of a spectral distribution measuring device of the present invention will be described with reference to the accompanying drawings.

Embodiment 1

Figure 1:
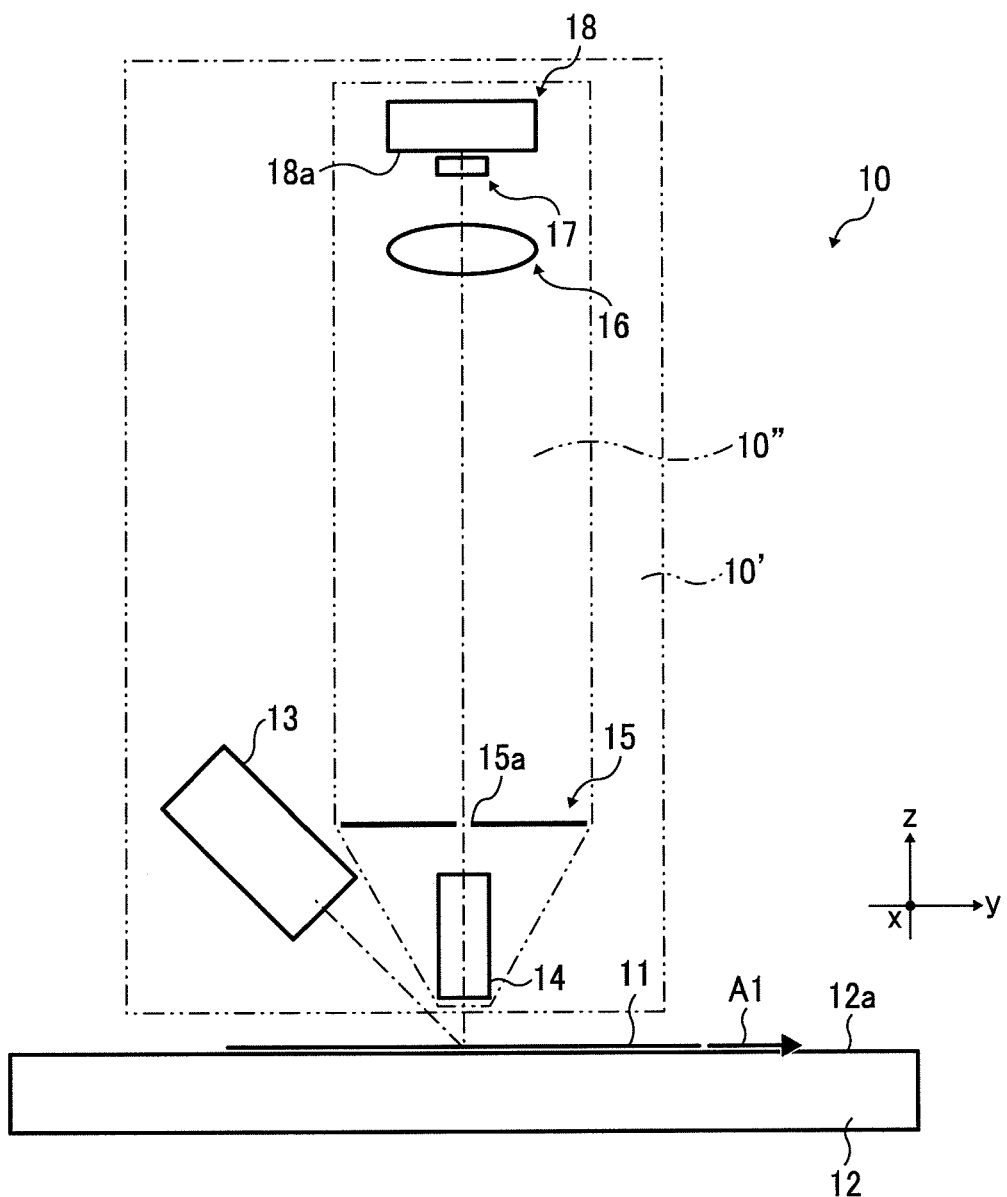
FIG. 1 is a schematic explanation view illustrating a configuration of a spectral distribution measuring device 10 according to Embodiment 1.
Figure 2:
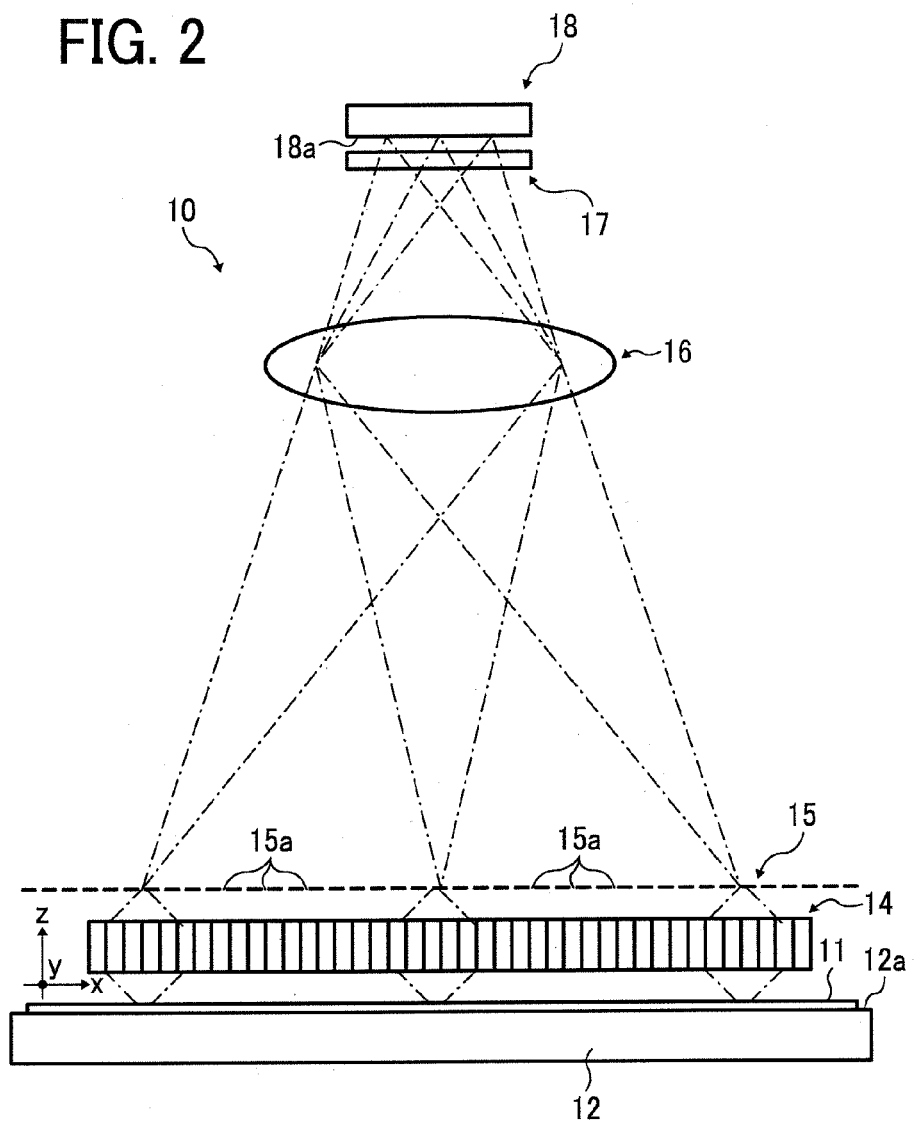
FIG. 2 is a schematic explanation view illustrating a configuration of a spectral distribution measuring device 10 as seen from a positive side in a y-axis direction in FIG. 1.

In FIGS. 1, 2, reference number 10 denotes a spectral distribution measuring device and reference number 11 denotes an object being measured (hereinafter, measuring object) of the spectral distribution measuring device 10, which is a target being measured. The measuring object 11 is a printed material of paper (image forming medium). For example, an image is formed on the surface of the printed material.

The spectral distribution measuring device 10 measures a spectral distribution of light reflected by each point on an image when white light is illuminated to an image on the surface of the measuring object 11.

The spectral distribution measuring device 10 includes a platform 12 on which the measuring object 11 is placed and a scanning section 10' which scans the surface of the measuring object 11 placed on the platform 12.

In the present embodiment, the scanning section 10' is fastened in the main body of the spectral distribution measuring device 10. The platform 12 is configured to move in the horizontal direction (the arrow A1 direction in FIG. 1) with respect to the main body of the spectral distribution measuring device 10 at a predetermined speed.

The platform 12 can be fixed to the main body of the spectral distribution measuring device 10, and the scanning section 10' can be moved in the horizontal direction with respect to the main body of the spectral distribution measuring device 10 at a predetermined speed.

The platform 12 includes in the upper portion thereof a flat surface 12a. The measuring object 11 can be placed on the flat surface 12a. The measuring object 11 relatively moves to the scanning section 10' by moving the platform 12 in a state in which the measuring object 11 is placed on the flat surface 12a.

The scanning section 10' includes an illumination unit 13 which illuminates a light beam to the measuring object 11 on the flat surface 12a and a light-receiving unit 10" which obtains spectral distribution information of diffused reflection light from the measuring object 11. The light-receiving unit 10" includes a light condensing optical system 14, a slit array 15, a focusing optical system 16, a diffraction unit 17 and a linear image sensor 18.

Here, a y-axis is set to extend in the moving direction of the measuring object 11 (the arrow A1 direction) along the flat surface 12a and an x-axis is set to extend in the direction orthogonal to the y-axis (the direction vertical to the paper in FIG. 1) along the flat surface 12a. Also, a z-axis is set in the normal line direction of the flat surface 12a. These directions are used in the following description.

The illumination unit 13 illuminates the surface of the measuring object 11 placed on the flat surface 12a by white light extending in the x-axis direction. In this embodiment, the entire area of the measuring object 11 in the width direction (x-axis direction) is highly illuminated by the illumination unit 13.

As illustrated in FIG. 1, in this embodiment, the illumination direction of the illumination unit 13 (the optical axis direction of the illumination unit 13) is inclined at 45 degrees with respect to the normal line direction (z-axis direction) of the flat surface 12a.

As described above, in the spectral distribution measuring device 10, light is illuminated from the direction inclined at 45 degrees from the normal line direction with respect to the surface of the measuring object 11 placed on the flat surface 12a, and the light reflected in the normal line direction of the surface of the measuring object 11 is received by the linear image sensor 18 out of the diffused reflection light reflected by the surface of the measuring object 11.

More specifically, the spectral distribution measuring device 10 of Embodiment 1 is disposed as so-called 45°/0° geometry. Although not illustrated in the figures, the illumination unit 13 includes an LED array in which white LEDs are arranged in a straight line and a collimate lens which changes the white light emitted from the array into parallel light.

The light condensing optical system 14 focuses the light reflected from the surface of the measuring object 11 in the substantially normal line direction (z-direction) on the position of the slit array 15. It is preferable for the light condensing optical system 14 to be an erect magnification optical system. More specifically, as illustrated in FIG. 2, the erect configuration optical system can be obtained by disposing a plurality of GRIN lenses (gradient index lenses) along the x-axis direction.

Figure 3:
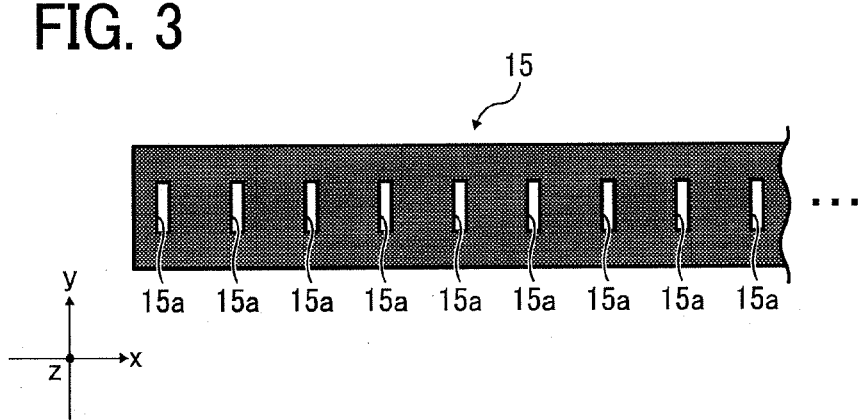
FIG. 3 is a schematic explanation view illustrating a configuration of a slit array 15.

As illustrated in FIG. 3, the slit array 15 is a space filter in which a plurality of slits 15a is formed on a light shielding plate member in a straight line at the same intervals. In the slit array 15 according to Embodiment 1, a plurality of slits 15a each extending in the y-axis direction is disposed in parallel to each other in the x-axis direction at the same intervals.

As illustrated in FIG. 2, the light condensing optical system 14 focuses the diffused reflection light from a predetermined area on the surface of the measuring object 11 in an opening area of the corresponding each slit 15a of the slit array 15. In addition, the above-predetermined area in which the spectral distribution is measured on the surface of the measuring object 11 is referred to as an area being measured (hereinafter, measuring area).

The position of each slit 15a in the slit array 15 is set according to the position of the measuring area on the surface of the measuring object 11. By disposing the light condensing optical system 14 between the measuring object 11 and the slit array 15 as described above, the spectral distribution of the measuring area can be measured without moving the measuring object 11 and the slit array 15 towards each other.

As illustrated in FIG. 2, the focusing optical system 16 focuses the reflection light from the measuring object 11 which has passed through each slit 15a of the slit array 15 on the sensor face 18a of the linear image sensor 18 after diffracting the reflection light by the diffraction unit 17.

This focusing optical system 16 is configured by using a general lens system. It is preferable for the focusing optical system 16 to be a lens system which can sufficiently correct chromatic aberration.

The diffraction unit 17 is disposed between the focusing optical system 16 and the linear image sensor 18, and disperses each reflection light which has passed through each slit 15a of the slit array 15, so as to illuminate the band-like diffraction image of each reflection light on the sensor face 18a of the linear image sensor 18.

In Embodiment 1, the imaging optical system 16 includes an optical system having a high telecentric property on the image side, such that the light incident direction to the diffraction unit 17 becomes vertical (z-direction) as much as possible. In addition, in Embodiment 1, a transparent diffraction grating is used for the diffraction unit 17.

Figure 4:
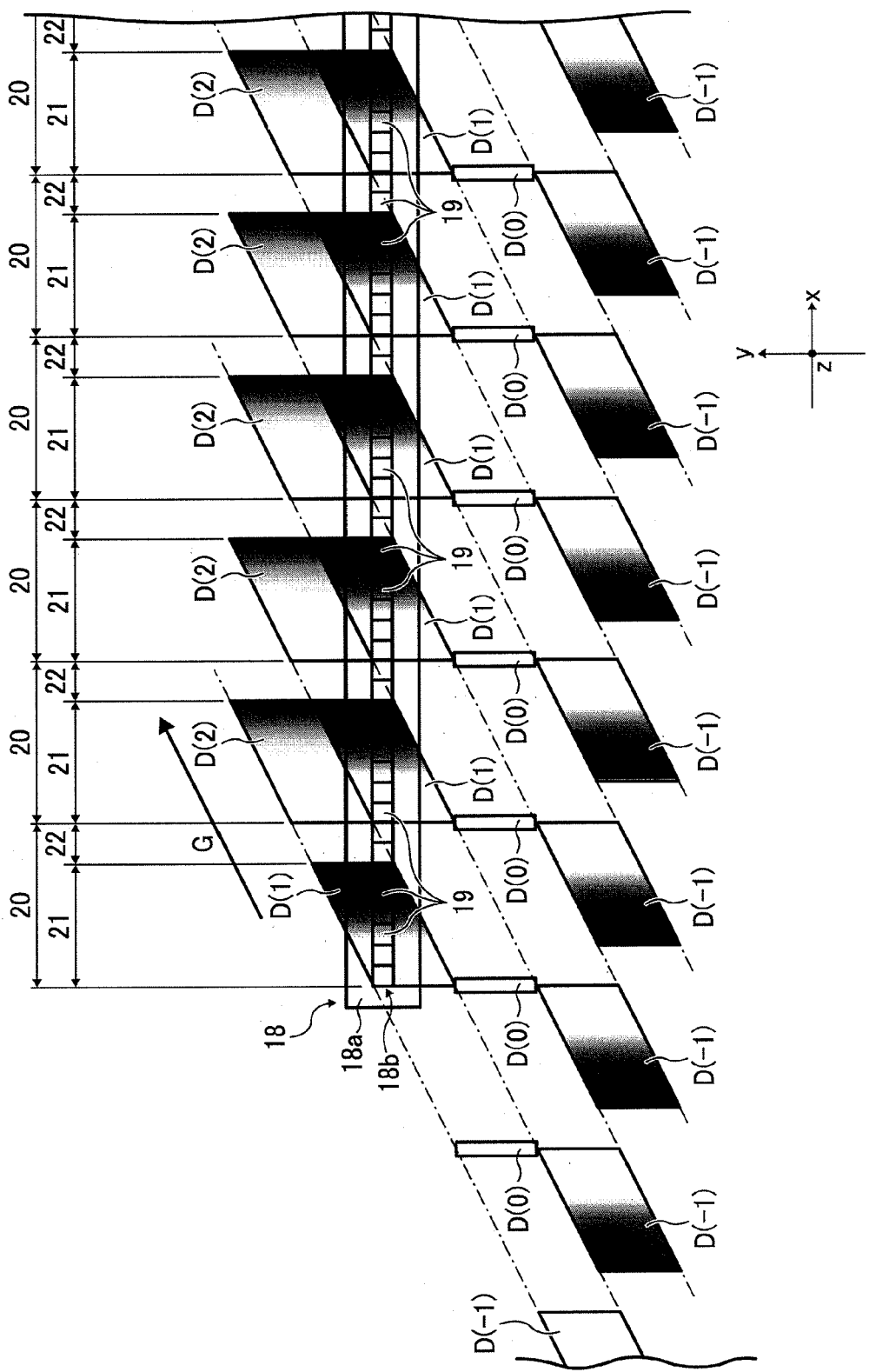
FIG. 4 is an explanation view illustrating each diffraction image on a sensor face 18a of a linear image sensor 18.

As illustrated in FIG. 4, in the spectral distribution measuring device 10 of this embodiment, the diffraction unit 17 is disposed such that an angle between the direction (hereinafter, diffraction direction G) in which the diffraction image by the diffraction unit 17 expands on the sensor face 18a of the linear image sensor 18 and the direction (x-axis direction) in which a plurality of pixels 19 of the linear image sensor 18 is arranged becomes a predetermined angle θ.

More specifically, the diffraction unit 17 is disposed in a state in which the diffraction direction G is rotated at an angle θ about the z-axis from a state in which the diffraction direction G conforms to the x-axis direction.

If each reflection light which has passed through each slit 15a of the slit array 15 is diffracted by the diffraction unit 17 rotated at an angle θ about the z-axis as described above, the diffraction image of each reflection light is focused on the sensor face 18a in a state which is rotated at an angle θ to the direction (x-axis direction) in which a plurality of pixels 19 is arranged on the sensor face 18a of the linear image sensor 18.

In this case, the zero order diffraction light is not dispersed, and the diffraction light except for the zero order diffraction light is dispersed at a diffraction angle according to wavelengths, and is focused on the sensor face 18a of the linear image sensor 18.

In addition, in Embodiment 1, each slit 15a of the slit array 15 has a rectangular shape (refer to FIG. 3), so that the diffraction image of each order is a parallelogram inclined according to the inclination of the diffraction direction G on the sensor face 18a of the linear image sensor 18 (refer to FIG. 4).

In the spectral distribution measuring device 10 of this embodiment, the first order diffraction light is only measured out of respective order diffraction light of respective reflection light which has passed through respective slits 15a.

Furthermore, the inclination of the diffraction unit 17 is set such that the irradiated area corresponding to the wavelength range being measured (hereinafter, measuring wavelength range) is only irradiated on the light-receiving surface 18b of the sensor face 18a in the diffraction images of the first order diffraction light on the sensor face 18a, which has passed through the respective slits 15a.

The above measuring wavelength range can be set to a wavelength range generally defined as a visible light range, for example.

When the transparent diffracting grating is used as the diffraction unit 17, where the wavelength of light diffracted by the diffraction grating is λ, the incident angle of light to the normal line direction of the diffraction grating is θ in, the diffraction angle of light to the normal line direction of the diffraction grating is θ out, the grating interval of the diffraction grating is dL, and the order of the diffraction is k (k is integer number), the following relationship is generally established.

$$\sin\theta\ \text{out} = (k \times \lambda)/dL + \sin\theta\ \text{in}$$

In the explanation view of FIG. 4 illustrating the sensor face 18a, for descriptive purpose, the reference number of k-order diffraction image of each reflection light from each slit 15a by the diffraction unit 17 is D (k) (k is integer number), and each k-order diffraction image is illustrated as a parallelogram area.

In the configuration of the spectral distribution measuring device 10 of the present embodiment, an angle in which a diffraction image expands to a predetermined measuring wavelength range can be calculated by the above equation. Therefore, according to this calculation, for example, the position and the size of each k-order diffraction image D (k) (k is integer number) on the sensor face 18a are adjusted by appropriately adjusting the size and the interval of each slit 15a of the slit array 15, the power of the focusing optical system 16 and the position of each component while performing the focusing adjustment.

By adjusting as described above, the light of the irradiated area corresponding to the measuring wavelength range of the first order diffraction image D (1) of each reflection light from each slit 15a by the diffraction unit 17 is only irradiated on the light-receiving face 18b of the linear image sensor 18. This adjustment will be described later.

As illustrated in FIG. 4, a plurality of rectangular pixels 19 arranged in a straight line is formed on the sensor face 18a of the linaer image sensor 18, and the light-receiving face 18b of the linear image sensor 18 is formed by these pixels 19.

The linear image sensor 18 includes inside thereof light-receiving elements. The light-receiving elements are arranged in positions corresponding to the positions of the pixels 19. These light-receiving elements output electric signals corresponding to light intensity irradiated to the pixels 19, respectively.

The linear image sensor 18 outputs the data of the light intensity received by each pixel 19 as data aggregate of these data (image data). In this embodiment, the arrangement direction of a plurality of pixels 19 of the linear image sensor 18 agrees with the width direction (x-axis direction) of the measuring object 11.

In this embodiment, the light-receiving face 18b of the linear image sensor 18 is equally divided into a plurality of areas (each having a predetermined length in the x-axis direction), and is used for spectral measurement. These areas are referred to as spectral light irradiated areas. Each spectral light-irradiated area includes the predetermined number of pixels 19 of the linear image sensor 18.

Then, the diffraction image of the reflection light which has passed through each slit 15a enters into each spectral light-irradiated area. Namely, a plurality of pixels 19 in each spectral light-irradiated area of the linear image sensor 18 and the slit 15a corresponding to that spectral light-irradiated area form one spectral sensor 20.

Each spectral light-irradiated area is further divided into an area 21 which is used for spectral measurement (hereinafter, measurement area 21) and an area 22 which is not used for spectral measurement (hereinafter, non-measurement area 22).

In Embodiment 1, each spectral sensor 20 includes eight pixels 19 in total, and the area of six pixels 19 out of the eight pixels 19 is used as the measurement area 21 and the area of two pixels 19 out of the eight pixels 19 is used as the non-measurement area 22. A method of setting the number of these pixels will be described later.

Moreover, as illustrated in FIG. 4, each pixel 19 disposed in a straight line of the linear image sensor 18 according to Embodiment 1 is a square as seen the sensor face 18a from the front face side. Hereinafter, a length of one side of each square pixel 19 is p (refer to FIG. 5).

In the spectral distribution measuring device 10 of this embodiment, positional relationship of the light condensing optical system 14, the slit array 15, the focusing optical system 16, the diffraction unit 17 and the linear image sensor 18 is set such that each diffraction image of each reflection light from each slit 15a by the diffraction unit 17 is located in the following irradiated position on the light-receiving face 18b.

The diffraction unit 17 according to the present embodiment is disposed in a state which is rotated at an angle θ about the z-axis from the state in which the diffraction direction G agrees with the x-axis direction. Therefore, as illustrated in FIG. 4, the respective first order diffraction light of reflection light from the respective slits 15a by the diffraction unit 17 are irradiated at predetermined intervals along the x-axis direction. In FIG. 4, $-1^{st}$ order, 0 order, $1^{st}$ order and 2nd order diffraction images are only described.

In the spectral distribution measuring device 10 of the present embodiment, the light of irradiated area corresponding to the measuring wavelength range in the first order diffraction image D (1) of each reflection light from each slit 15a by the diffraction unit 17 is only illuminated on the light-receiving face 18b. The diffraction image of another order is set not to be placed on the light-receiving face 18b.

More particularly, as illustrated in FIG. 4, on the sensor face 18a of the linear image sensor 18, by each reflection light from each slit 15a, the zero order diffraction image D (0) is located on the negative side of the y-axis direction of the light-receiving face 18b, and the light of the irradiated area corresponding to the measuring wavelength range of the first order diffraction image D (1) is located on the light-receiving face 18b, and the second order diffraction image D (2) is located on the positive side of the y-axis direction of the light-receiving face 18b.

The inclination angle θ of the diffraction direction G from the x-axis direction is set such that the light of the irradiated areas corresponding to the measuring wavelength areas of the first order diffraction images D (1) next to each other do not overlap on the light-receiving face 18b, and the diffraction light from another the slits 15a does not overlap on the light-receiving face 18 where the first order diffraction image D (1) is located.

The inclination angle θ of the diffraction direction G from the x-axis direction is set such that the light of the irradiated area corresponding to the measuring wavelength range of each of the first order diffraction images D (1) irradiates the entire area of the measurement area 21 of the corresponding each spectral sensor 20.

Figure 5:
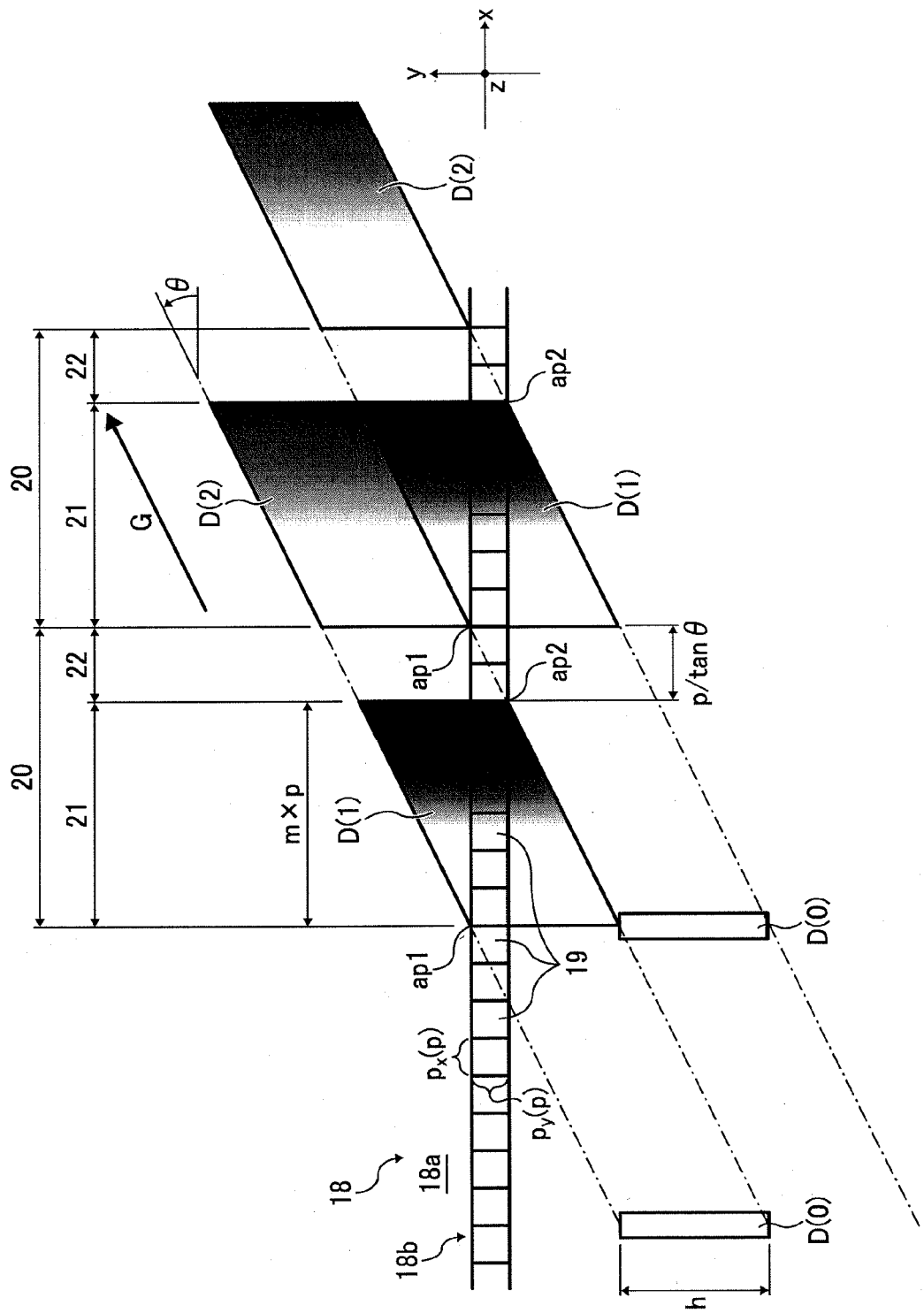
FIG. 5 is a partial enlargement view of FIG. 4 illustrating a positional relationship of the first order diffraction image D (1) to a light-receiving face 18b of the linear image sensor 18.

In FIG. 5, regarding the parallelogram first order diffraction image D (1), when the top left apex is ap1 and the right below apex which is located in the diagonal position of the top left apex is ap2, the apex ap1 coincides with the top left apex angle of each measurement area 21 and the apex ap2 coincides with the right below apex angle of each measurement area 21.

In this case, if the number of pixels 19 constituting each area 21 is m (m=6 in Embodiment 1), the length in the x-axis direction of the pixel 19 is px, and the length in the y-axis direction of the pixel 19 is py (refer to FIG. 5), the length h of each k-order diffraction image D (k) (k is integer number) in the y-axis direction on the sensor face 18b is set to satisfy the following condition (1).

$$h > m \times px \times \tan\theta + py \quad \text{Condition (1)}$$

As described above, in Embodiment 1, each of the pixels 10 has a square shape in which the length of one side is p; thus, px=py=p. By setting as described above, the entire area of the m-number pixels 19 constituting the measurement area 21 can be irradiated by the light of the irradiated area of the measuring wavelength range of the corresponding first order diffraction image D (1).

However, the focus adjustment and the positional adjustment of the diffraction unit 17 to the sensor face 18a are simultaneously performed such that the length of the light of the irradiated area corresponding to the measuring wavelength range of each first order diffraction image D (1) in the x-axis direction becomes equal to the length of each measurement area 21 in the x-axis direction (px×the number of pixels m).

In addition, it is necessary for the upper limit of the above length h to be a value such that each zero order diffraction image D (0) does not overlap the light-receiving face 18b.

The number of pixels 19 n included in the non-measurement area 22 is set to satisfy the following equation (2) in a state in which the inclination angle θ of the diffraction direction G from the x-axis direction is set as described above, and the light of the irradiated area corresponding to each of the first order diffraction images D (1) is set to irradiate the entire area of the corresponding measurement area 21. Thereby, each of the second order diffraction images D (2) can be located on the positive side of the light receiving face 18b in the y-axis direction.

$$n \geq 1/\tan\theta \quad \text{Condition (2)}$$

Namely, in order to locate each second-order diffraction image D (2) on the positive side of the light-receiving face 18b in the y-axis direction, it is necessary for the length (px×the number of pixels n) of the area 22 in the x-axis direction to satisfy (py/tan θ) or more. In this embodiment, px=py=p, so that the condition (2) is established.

As described above, if the number of pixels 19m of each measurement area 21 is set, and the inclination angle θ of the diffraction direction G from the x-axis direction is set to correspond to the number of pixels, the number of pixels n constituting the non-measurement area 22 is determined by the condition (2).

As described above, the number of pixels 19(m+n) in which each spectral light-irradiated area of the linear image sensor 18 individually corresponds to each reflection light from each slit 15a is determined.

Therefore, the magnification of the focusing optical system 16 is set such that the length, in the z-axis direction, of the light of the irradiated area corresponding to the measuring wavelength range of the first order diffraction image D (1) becomes equal to the length (px×the number of pixels m), in the x-direction, of each measurement range 21 when focusing each reflection light from each slit 15a on the sensor face 18a by the focus adjustment, in consideration of the positional relationship of the light condensing optical system 14, the slit array 15, the imaging optical system 16 and the linear image sensor 18 and the positional relationship of the diffracting unit 17 to the sensor face 18a.

In other words, the magnification of the light condensing optical system 14 is set such that the interval, which is determined by the intervals of respective slits 15a of the slit array 15, in the x-axis direction on the sensor face 18a, of the light of the irradiated area corresponding to the measuring wavelength range of each first order diffraction image D (1) becomes (m+n) px (in this example, px=p).

The length of each slit 15a in the y-axis direction is set such that the length h of each diffraction image in the y-axis direction on the sensor face 18a satisfies the condition (1) in a state in which each reflection light from each slit 15a is adjusted to be focused on the sensor face 18a, and the positional relationship of the diffraction unit 17 to the sensor face 18a is adjusted such that the length, in the x-axis direction on the sensor face 18a, of the light of the irradiated area corresponding to the measuring wavelength range of each first order diffraction image D (1) becomes equal to the length of each measurement area 21 in the x-axis direction (px×the number of pixels m).

Accordingly, the light of irradiated areas corresponding to the measuring wavelength ranges of the first order diffraction images D (1) next to each other do not overlap on the light-receiving face 18b, the diffraction light from another slit 15a does not overlap with the light-receiving face 18b where the first order diffraction image D (1) is located, and the entire area, in the x-axis direction, of the irradiated area corresponding to the measuring wavelength area of each first order diffraction image D (1) is located on the light-receiving face 18b.

In Embodiment 1, each measurement area 21 is constructed by the six pixels 19 and the diffraction direction G is set to tan θ=0.5 to the x-axis direction. In this case, it is necessary for the length h of each k-order diffraction image D (k) (k is integer number) on the sensor face 18a to be (4×p) or more, and for the non-measurement area 22 to be constituted by the two or more pixels 19.

By setting as described above, the spectral distribution of each measurement area of the measuring object 11 can be measured by a plurality of spectral sensors 20 each of which uses 8 pixels 19 of the linear image sensor 18 as one pair.

Therefore, when a line sensor having 2048 pixels, for example, is adopted for the linear image sensor 18, 256 spectral sensors 20 can be obtained, so that the spectral distribution at 256 points on a measuring object can be simultaneously measured.

In this embodiment, the number of channels (six) of the light-receiving data is relatively a few, so that a general estimation technique can be used for estimating the spectral distribution from these data.

A method of estimating a spectral distribution by using the method of least squares from a measurement result of a known sample described in Pages 384-391, Optics 27 (1998) "Estimation of Spectral Reflectances from Multi-Band Images by Multiple Regression Analysis" Norimichi TSUMURA, Hideaki HANEISHI and Yoich MIYAKE, for example.

As described above, in the spectral distribution measuring device 10, the linear white light beam to be emitted by the illumination unit 13 is irradiated to the measuring object 11, and the reflection light from the surface of the measuring object 11 is received by the linear image sensor 18 through the light condensing optical system 14, the slit array 15, the focusing optical system 16 and the diffraction unit 17. Thereby, the spectral distribution of the reflection light in each measurement area on the surface of the measuring object 11 corresponding to each slit 15a of the slit array 15 is measured.

As described above, by measuring the spectral distribution of each measuring area of the surface of the measuring object 11 corresponding to the opening area of each slit 15a, the colors can be measured. Therefore, different from the configuration which measures using a plurality of scanning units corresponding to different wavelength bands described in the measuring device in JP2008-518218A and the configuration which measures the reflection light from the surface of the measuring object area by different color illumination, the reflection light from each measuring area on the surface of the measuring object 11 is received by the single linear image sensor 18. Thus, the spectral distribution of each measuring area can be simultaneously measured, and the colors of the surface of the measuring object 11 can be measured with high accuracy.

Moreover, the diffraction unit 17 is disposed such that the diffraction direction G of the diffraction image on the sensor face 18a inclines at an angle θ to the arrangement direction (x-axis direction) of a plurality of pixels 19 of the linear image sensor 18, so that the light of an irradiated area corresponding to the measuring wavelength range of each first order diffraction image D (1) is only illuminated on the light-receiving face 18b, and the diffraction image D (k) (k is integer number except 1) except for the first order, which becomes noise in measuring, is not received. Therefore, the deterioration in the measurement accuracy can be prevented.

In the spectral distribution measuring device 10 in Embodiment 1, by setting to satisfy the condition (1), by each first order diffraction image D (1), the entire area of the measurement range 21 corresponding to each spectral sensor 20 can be irradiated, so that the color of each measuring area of the surface of the measuring object 11 can be accurately measured, and the colors of the surface of the measuring object 11 can be measured with high accuracy. This will be described below.

Figure 6:
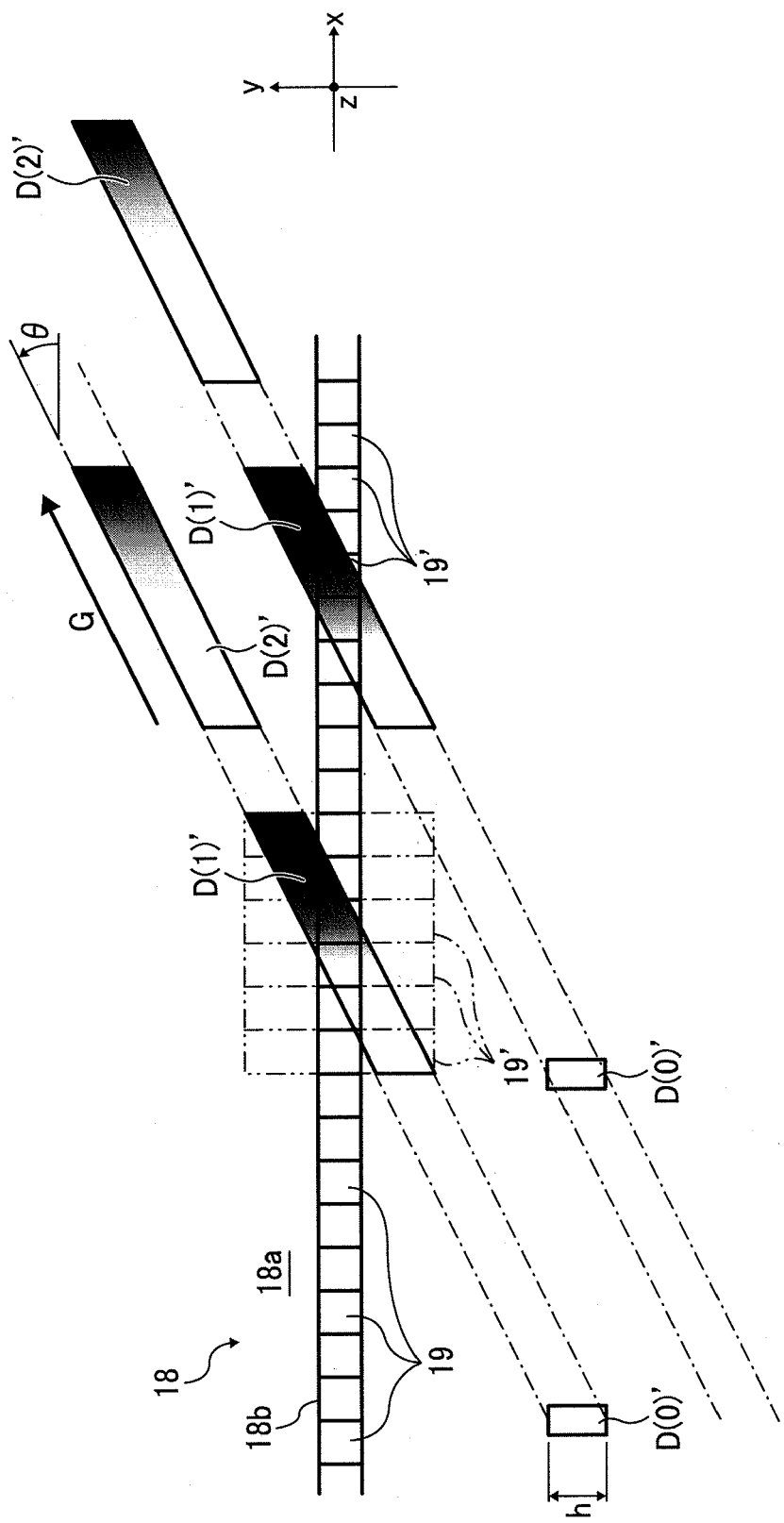
FIG. 6 is a partial enlargement view of FIG. 4 illustrating a positional relationship of the first order diffraction image D (1)' to the light-receiving face 18b of the linear image sensor 18.

For example, if the diffraction direction G of the diffraction image is set to the above angle θ, in order to irradiate only each first order diffraction image D (1)' on the light receiving face 18b, when the length h of each first order diffraction image D'(k) (k is integer number) in the y-axis direction as illustrated in FIG. 6 does not satisfy the condition (1), some of the light of the irradiated area corresponding to the measuring wavelength range of each first order diffraction image D (1)' is only irradiated on the light receiving face 18b, so that the measuring wavelength range is narrowed.

In this case, in order to measure colors with high accuracy, as illustrated in the two-dots chained line in FIG. 6, use of a linear image sensor having pixels 19' each having a long side in the y-axis direction is considered. However, such an image sensor is not generally used, causing an increase in cost.

However, in the spectral distribution measuring device 10 of Embodiment 1, the length h of each k-order diffraction image D (k) (k is integer number) in the y-axis direction on the sensor face 18a is set to satisfy the condition (1) by setting the length of each slit in the y-axis direction while considering the magnification of the focusing optical system 16. Therefore, the colors can be measured with high accuracy despite the shape of each pixel of the line sensor.

In particular, in a generally used line sensor, since each pixel has a square shape as illustrated in Embodiment 1, it is preferable to be set to (px=py=p) in the condition (1), and by setting the length h of the sensor face 18a to satisfy the condition (1), a general line sensor can be used without using a special line sensor. Therefore, the colors can be measured with high accuracy while controlling the increase in the costs.

In the spectral distribution measuring device 10, the condition (2) is satisfied, each second order diffraction image D (2) can be located on the positive side in the y-axis direction on the light receiving face 18b, so that the deterioration in the measurement accuracy by the illumination of the second order diffraction image D (2) or a part of that in the measurement area 21 can be prevented.

In the spectral distribution measuring device 10, the number of pixels 19 constituting each measurement area 21 is m and the inclination angle from the x-axis direction of the diffraction direction G is θ, and the number of pixels 19 constituting the non-measurement area 22 is determined by the condition (2), and the magnification of the light condensing optical system 14 is determined while considering the interval of each slit 15a such that the interval of the x-axis direction on the sensor face 18a of the light of the illuminated area corresponding to the measuring wavelength area of each first order diffraction image D (k) (k is integer number) becomes (m+n) px (in this example, px=p).

Since the position of the measurement area 21 in the x-axis direction on the sensor face 18a agrees with the position of the first order diffraction image D (1) of each reflection light from the slit 15a, the light-receiving face 18b is effectively used, and the colors can be measured with high accuracy.

Consequently, the spectral distribution measuring device 10 in this embodiment can measure colors of a measuring object with high accuracy even if it has a simple configuration.

Embodiment 2

Next, a spectral distribution measuring device 102 according to Embodiment 2 of the present invention will be described. In Embodiment 2, the wavelength range of the first order diffraction image D (1) which is measured by the linear image sensor 18 is set to a predetermined range by limiting the wavelength range of the light to be irradiated by a light source.

Since the basic configuration of the spectral distribution measuring device 102 of Embodiment 2 is similar to the configuration of the spectral distribution measuring device 10 of Embodiment 1, the same reference numbers are applied to the same portions, and the description thereof will be omitted.

Figure 7:
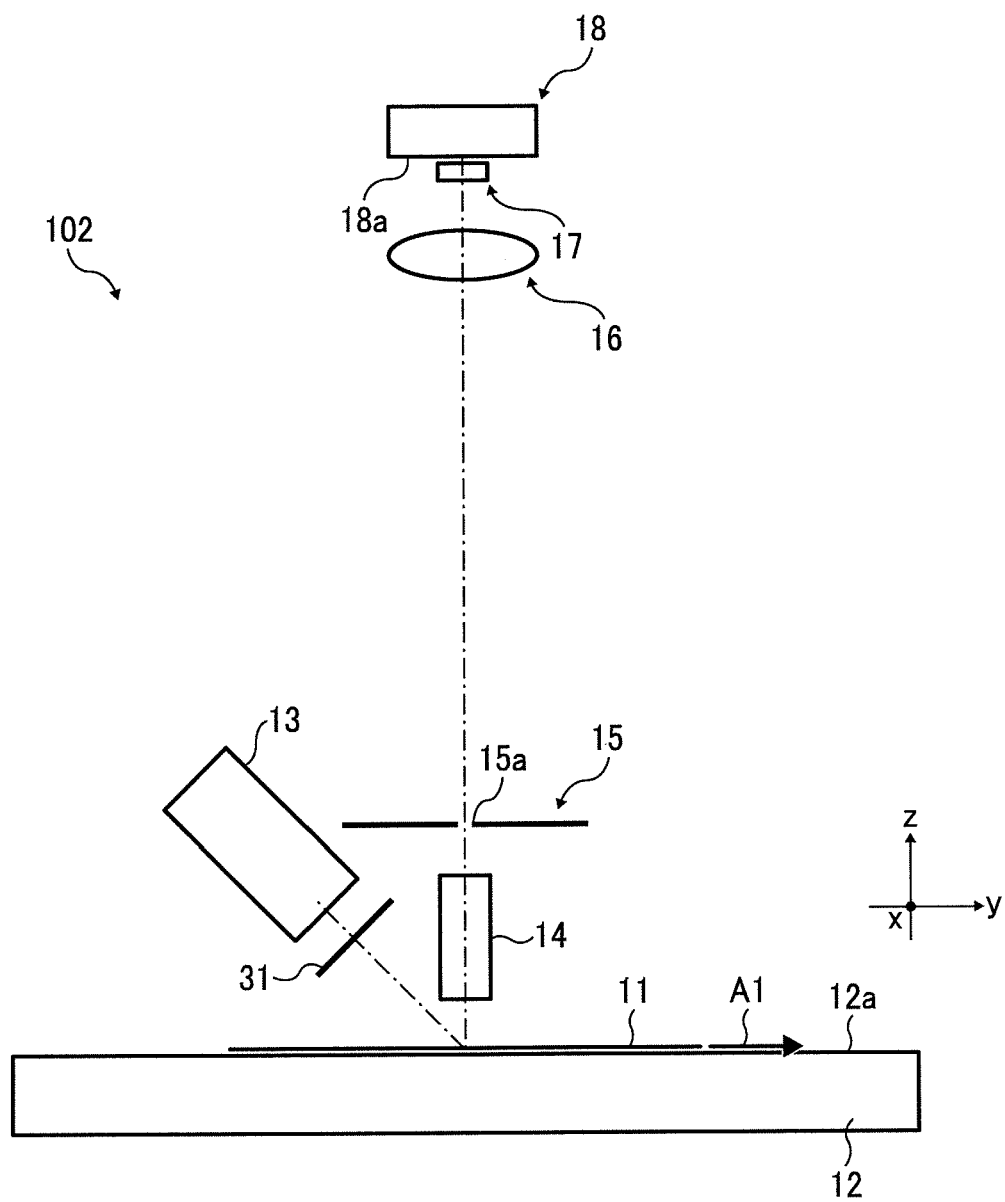
FIG. 7 is a schematic explanation view illustrating a configuration of a spectral distribution measuring device 102 according to Embodiment 2.

As illustrated in FIG. 7, in the spectral distribution measuring device 102 of this embodiment, a wavelength controller 31 is provided on the optical path from the illumination unit 13 to the flat surface 12a.

The wavelength controller 31 controls the wavelength range of the light beam irradiating the surface of the measuring object 11 placed on the flat surface 12a, in order to control the wavelength range of the first order diffraction image D (1) which is measured by the linear image sensor 18.

The wavelength controller 31 according to Embodiment 2 includes a bandpass filter, and its transparent wavelength range is set from 400 nm-700 nm.

According to the JIS standard, the wavelength range of light regarding color measurement is generally from 380 nm-780 nm of the measurement wavelength range of the first spectral photometer described in JIS Z 8722:2009.

Since the color material such as ink and toner for use in printing has a relatively smooth spectral distribution, if the wavelength range is controlled to 400 nm-700 nm which is the wavelength range of the second spectral photometer described in JIS Z 8722:2009, the colors can be measured with sufficiently high accuracy.

In the spectral distribution measuring device 102 of Embodiment 2, the first order diffraction light out of respective order diffraction light of reflection light which has passed through respective slits 15a of the slit array 15 is only illuminated on the light-receiving face 18b of the linear image sensor 18, so as to obtain image data, so that the color of the measuring area of the surface of the measuring object 11 corresponding to each slit 15a is measured (refer to FIG. 4).

For this reason, in order to measure colors with high accuracy, it is preferable that the irradiated position of each first order diffraction image D (1) does not overlap with the irradiated position of another diffraction image on the light-receiving face 18b.

If the wavelength range of the light irradiating the measuring object 11 is set to 380 nm-780 nm of the measurement wavelength range of the first spectral photometer, in the spectral using a diffraction grating, the second order diffraction image having 380 nm wavelength is irradiated in the same position as the position of the first order diffraction image having 760 nm wavelength. For this reason, the first order diffraction image D (1) and the second order diffraction image D (2) of each reflection light from each slit 15a by the diffraction unit 17 are overlapped on the light-receiving face 18b in the wavelength range of 380 nm-390 nm, resulting in the deterioration in measurement accuracy.

Consequently, if the lower limit of the wavelength range of the light irradiating the measuring object 11 is limited to 400 nm, the first order diffraction image D (1) and the second order diffraction image D (2) by the diffraction unit 17 of each reflection light from each slit 15a can be prevented from being overlapped, so that the colors can be measured with high accuracy.

In this embodiment, the wavelength of the light which is irradiated by the light source is limited to 400 nm-700 nm, which is the wavelength range of the second spectral photometer.

Moreover, if the interval of each first-order diffraction image D (1) in the x-axis direction is set to (m+n) px (in this example, px=p) on the sensor face 18a, the ratio of the length of the first order diffraction image D (1) in the x-axis direction and the length of the interval between the first-order diffraction image D (1) and the neighboring first-order diffraction image D (1) in the x-axis direction can be set to 3:1.

Therefore, the ratio of the length in the direction in which the pixels 19 of the measurement area 21 and the non-measurement area 22 of the linear image sensor 18 are arranged can be set to 3:1, and the measurement area 21 can be constructed by six pixels 19 and the non-measurement area 22 can be constructed by two pixels 19.

Since the basic configuration of the spectral distribution measuring device 102 in Embodiment 2 is similar to the spectral distribution measuring device 10 of Embodiment 1, the effect similar to that of the spectral distribution measuring device 10 of Embodiment 1 can be obtained.

In the spectral distribution measuring device 102 in Embodiment 2, the transparent wavelength range of the wavelength controller 31 is set from 400 nm-700 nm, and the irradiated position of each first order diffraction image D (1) does not overlap with the irradiated position of another diffraction image, so that the colors can be measured with high accuracy.

In this embodiment, the wavelength controller 31 is provided on the optical path from the illumination unit 13 to the flat surface 12a of the platform 12. However, the position of the wavelength controller 31 is not limited to the above. The wavelength controller 31 can be provided in the optical path from the illumination unit 13 to the linear image sensor 18 as long as it can control the first order diffraction image D (1) to be measured by the linear image sensor 18.

Embodiment 3

Next, a spectral distribution measuring device 103 according to Embodiment 3 will be described. Since the basic configuration of the spectral distribution measuring device 103 of Embodiment 3 is similar to that of the spectral distribution measuring device 10 of the above Embodiment 1, the same reference numbers are applied to the same portions, and the detailed descriptions thereof will be omitted.

Figure 8:
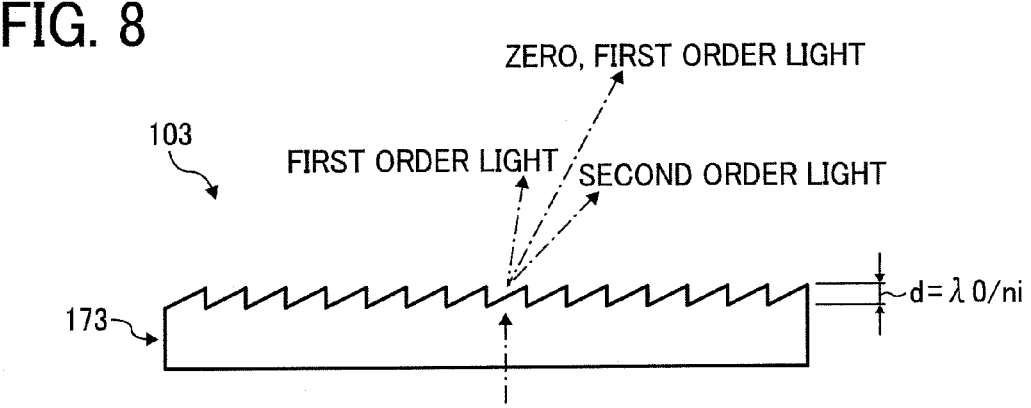
FIG. 8 is a schematic explanation view illustrating a configuration of a diffraction unit 173 of a spectral distribution measuring device 103 according to Embodiment 3.
Figure 9:
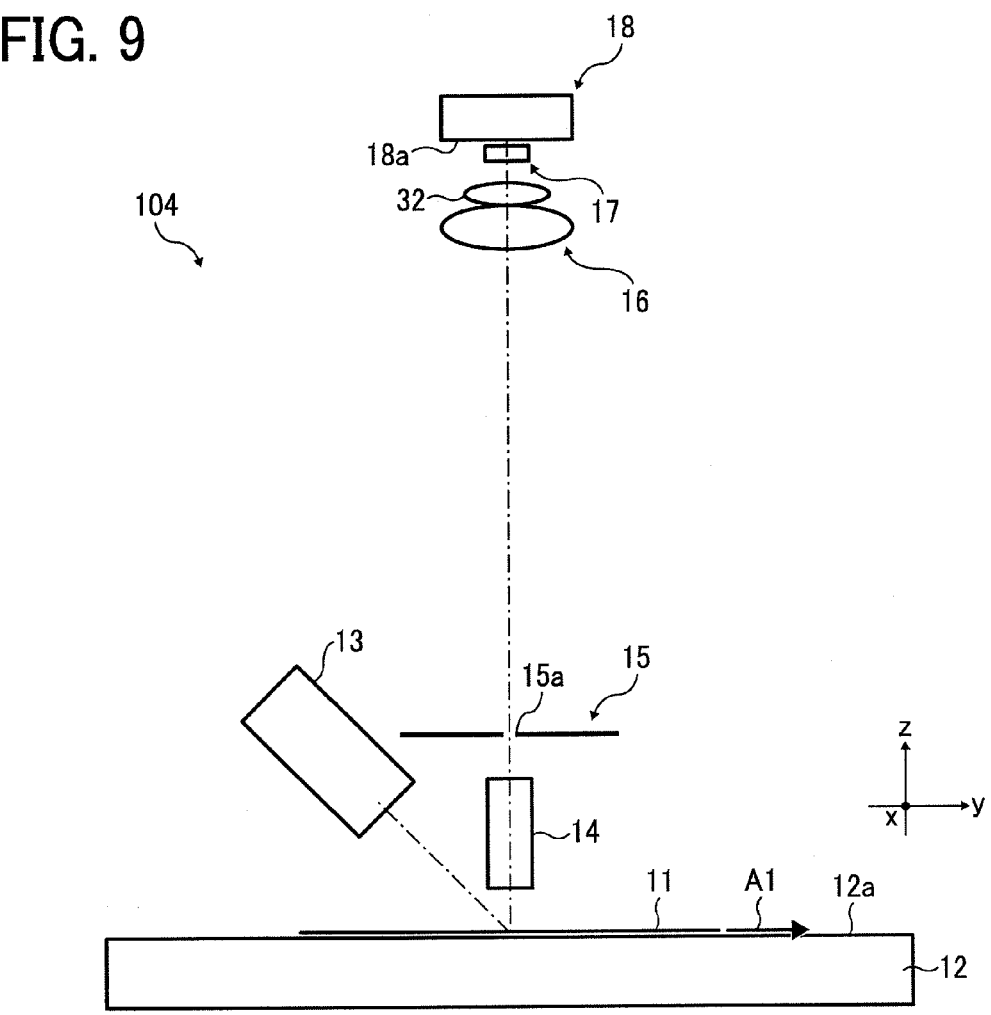
FIG. 9 is a schematic explanation view illustrating a configuration of a spectral distribution measuring device 104 according to Embodiment 4.

As illustrated in FIG. 8, in the spectral distribution measuring device 103 of Embodiment 3, as a diffraction unit 173, a brazed diffraction grating having a high diffraction efficiency to specific order and wavelength is used. The brazed diffraction grating has a substantial saw-tooth appearance in a cross section on the emission side.

Where the central wavelength of light entering onto the brazed diffraction grating is $\lambda 0$ and the refraction index of the material constituting the diffraction unit 173 is ni, when the stepped portion of the above substantially saw-tooth appearance portion of the diffraction unit 173 satisfies the following condition (3), the deflection angle of the transmitted light (zero order light) agrees with the deflection angle of the first order diffraction light, the diffraction efficiency with the central wavelength $\lambda 0$ becomes extremely high (about 100%), and the diffraction efficiency is increased in the wavelength range therearound.

$$d=\lambda 0/ni \qquad \text{Condition (3)}$$

The diffraction unit 173 according to Embodiment 3 having the central wavelength of 500 nm uses a brazed diffraction grating which satisfies the above (3), so that high diffraction efficiency can be obtained in the wavelength range from 400 nm-700 nm.

In the diffraction unit 173, the amount of $-1st$-order diffraction light and the amount of 2nd-order diffraction light are reduced; thus, the deterioration in the measurement accuracy by these noises can be controlled.

Since the basic configuration of the spectral distribution measuring device 103 of Embodiment 3 is similar to that of the spectral distribution measuring device 10 of Embodiment 1, the effect which is similar to the effect of Embodiment 1 can be obtained.

In the spectral distribution measuring device 103 of Embodiment 3, the amount of the first diffraction light having the central wavelength of 500 nm can be increased by the diffraction unit 173, so that the colors can be measured with high accuracy.

Since the amount of $-1^{st}$-order diffraction light and the amount of 2nd-order diffraction light of each reflection light from each slit 15 on the sensor face 18a by the diffraction unit 17 is decreased, the deterioration in the measuring accuracy caused by the noises by the components of the diffraction light can be controlled, and the colors can be measured with high accuracy.

The specific configuration of Embodiment 3 can be combined with the configuration of Embodiment 2. More specifically, the wavelength range of light is controlled to 400 nm-700 nm by the wavelength controller 31, each first order diffraction image D (1) is illuminated onto the measurement area 21 of each spectral sensor 20 by using the brazed diffraction grating which improves the diffraction efficiency of each first order diffraction image D (1) as the diffraction unit 173. Thereby, the colors can be measured with extremely high accuracy.

Embodiment 4

Next, a spectral distribution measuring device 104 according to Embodiment 4 of the present invention will be described. In Embodiment 4, the length h, in the y-axis on the sensor face 18a, of the k-order diffraction image D (k) (k is integer number) by the diffraction unit 17 of each reflection light from each slit 15a can be adjusted independently of the length, in the x-axis direction on the sensor face 18a, of each first order diffraction image D (1).

Since the basic configuration of the spectral distribution measuring device 104 of Embodiment 4 is similar to that of the spectral distribution measuring device 10 of Embodiment 1, the same reference numbers are applied to the same portions, and the description thereof will be omitted.

In the spectral distribution measuring device 104 of Embodiment 4, an astigmatism adder 32 is provided on the optical path between the imaging optical system 16 and the diffraction unit 17.

The astigmatism adder 32 is provided to independently adjust the length h, in the y-axis direction on the sensor face 18a, of the k-order diffraction image D (k) (k is integer number) by the diffraction unit 17 of each reflection light from each slit 15a.

The astigmatism adder 32 according to Embodiment 4 includes a cylindrical lens having a relatively small power, and can adjust the length h, in the y-axis direction on the sensor face 18a, of the light which has passed through the cylindrical lens.

In this embodiment, an achromatic lens is used for the cylindrical lens as the astigmatism adder 32. The achromatic lens is a compound lens designed to remove chromatic aberration by combining a plurality of lenses having different optical properties.

By removing the chromatic aberration with the use of the achromatic lens as the astigmatism adder 32, difference in colors resulting from the chromatic aberration generating in each first order diffraction image D (1) can be controlled, so that the colors can be measured with high accuracy.

In the spectral distribution measuring device 104 of Embodiment 4, similar to the other embodiments, the focusing adjustment and the positional adjustment of the diffraction unit 17 with respect to the sensor face 18a are simultaneously conducted such that the length, in the x-axis direction, of the light of the irradiated area corresponding to the measuring wavelength range of each first order diffraction image D (1) becomes equal to the length, in the x-axis direction, of each measurement area 21 (p××the number of pixels m).

However, by adjusting the length in this x-axis direction, an image may get longer by the influence of defocusing in the y-axis orthogonal to the x-axis. If an image gets longer by the influence of the defocusing, the length h, on the sensor face 18a, of each k-order diffraction image D (K) (k is integer number) may not satisfy a predetermined condition, the light of the irradiated area corresponding to the measuring wavelength range of each first order diffraction image D (1) is not irradiated on the entire area of the corresponding measurement area 21, and another diffraction image is irradiated on each measurement area 21, causing the deterioration in the measurement accuracy.

In the spectral distribution measuring device 104 of Embodiment 4, by adjusting the power of the astigmatism adder 32 and the position on the optical path of the astigmatism adder 32, the length h of each k-order diffraction image D (k) (k is integer number) in the y-axis direction on the sensor face 18a can be adjusted independently of the adjustment of the length in the x-axis direction on the sensor face 18a.

Therefore, the deterioration in the measurement accuracy by the influence of defocusing in the y-axis direction can be prevented.

Since the basic configuration of the spectral distribution measuring device 104 of Embodiment 4 is similar to that of the spectral distribution measuring device 10 of Embodiment 1, the effect similar to that of the spectral distribution measuring device 10 of Embodiment 1 can be obtained.

The spectral distribution measuring device 104 of Embodiment 4 includes the astigmatism adder 32, so that the length h of each k-order diffraction image D (k) (k is integer number) in the y-axis direction on the sensor face 18a can be adjusted to satisfy a predetermined condition independently of the adjustment of the length of each first order diffraction image D (k) (k is integer number) in the x-axis direction on the sensor face 18a. Thus, the colors can be measured with high accuracy.

Figure 10:
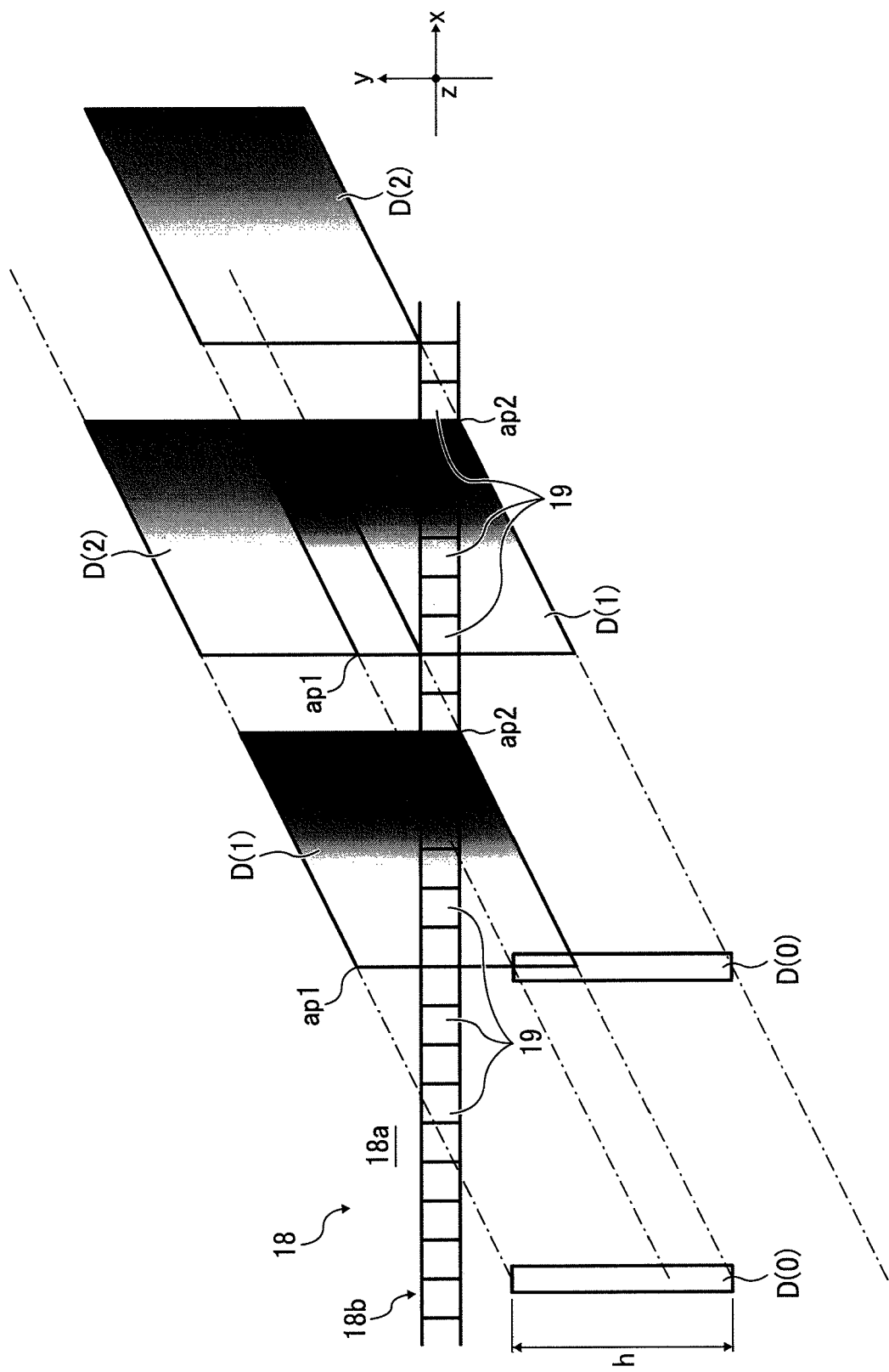
FIG. 10 is an explanation view illustrating a positional relationship of a first order diffraction image D (1) to the light-receiving face 18b of the linear image sensor 18 according to Embodiment 4.

Since the length h, in the y-axis direction on the sensor face 18a, of the k-order diffraction image D (k) (k is integer number) by the diffraction unit 17 of each reflection light from each slit 15a can be adjusted by the astigmatism adder 32, the relative position of the slit array 15 and the linear image sensor 18 can be flexibly determined by increasing the value h as much as possible within a range in which each zero order diffraction image D (0) does not overlap with the light-receiving face 18b (refer to FIG. 10).

As described above, if each zero order diffraction image D (0) does not overlap with the light-receiving face 18b even if the length h is increased to expand each k-order diffraction image D (k) (k is integer number) in the y-axis direction, each first order diffraction image D (1) is only located in each measurement area 21. Accordingly, the measurement accuracy does not deteriorate, and such setting is not a problem.

In the spectral distribution measuring device 104 of Embodiment 4, the achromatic lens is used as the astigmatism adder 32, the differences in colors of each first order diffraction image D (1) resulting from chromatic aberration can be controlled; thus, the colors can be measured with high accuracy.

The configuration of Embodiment 4 can be combined with the configuration of the Embodiment 2 and the configuration of Embodiment 3. More specifically, the wavelength range is limited to 400 nm-700 nm by the wavelength controller 31, and the brazed diffraction grating which improves the diffraction effects of the first order diffraction image D (1) is used as the diffraction unit 173, and each first order diffraction image D (1) is irradiated in the measurement range 21 of the spectral sensor 20 through the astigmatism adder 32, so that the colors can be measured with high accuracy.

Although the embodiments of the present invention have been described above, the present invention is not limited thereto. It should be appreciated that variations may be made in the embodiments described by persons skilled in the art without departing from the scope of the present invention.

In the above each embodiment, each slit 15a of the slit array 15 has a rectangular shape; however, the opening shape of each slit can be any shape, for example, an oval shape or a circular shape. In this case, when each slit has an oval shape, as illustrated in FIG. 11, both end portions of each k-order diffraction image D (k)" in the x-direction on the sensor face 18a has a curved line shape.

Figure 11:
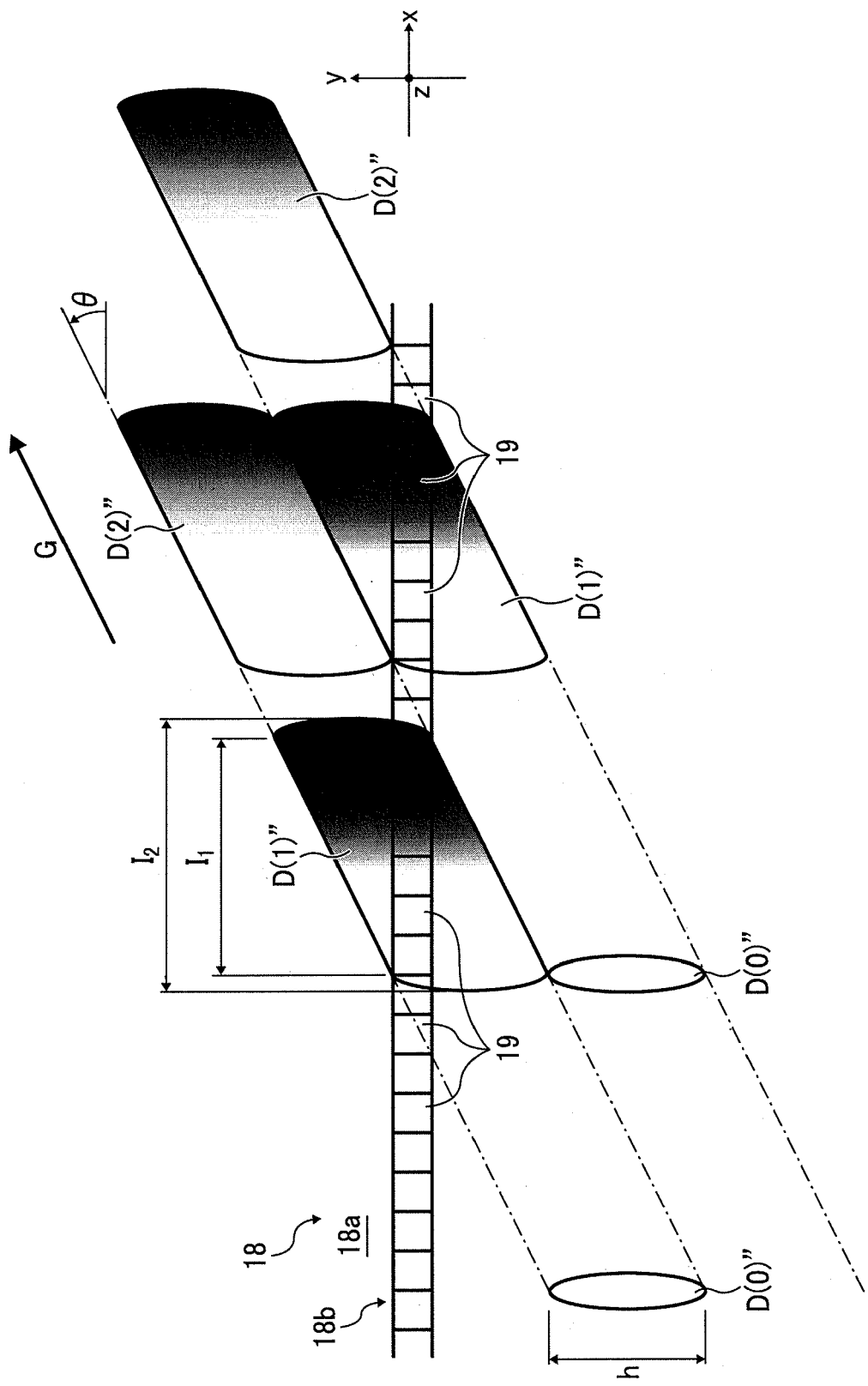
FIG. 11 is an explanation view illustrating a positional relationship of a first order diffraction image D"(1) to the light receiving face 18b of the linear image sensor 18 when each slit of the slit array 15 has an elliptical shape.

When the length, in the x-axis direction on the sensor face 18a, of each first order diffraction image D (1)" to each measurement area 21, the focusing and the position of the diffraction unit 17 to the sensor face 18a are adjusted, the interval $I_1$ having the length of each first order diffraction image D (1)" in the x-axis direction as a standard except for the expanded curved areas on both ends in the x-axis direction can be used, or the interval $I_2$ having the expanded curved apex position as a standard can be used (refer to FIG. 11).

When the interval $I_1$ is used, the entire area of all pixels 19 constituting the measurement area 21 corresponding to the first order diffraction image D (1)" can be irradiated. When the interval $I_2$ is used, the spectral distribution can be obtained based on the entire wavelength range dispersed by diffraction.

In the above each embodiment, a transparent diffraction grating is used as the diffraction unit 17 (173); however, a reflective diffraction grating can be used, for example. As the focusing optical system 16, a lens array can be used.

In the above each embodiment, the first order diffraction image D (1) is used for measuring, the same order diffraction image of each reflection light which has passed through each slit 15a of the slit array 15 can be used except for the zero order diffraction image and the first order diffraction image.

According to the above-described spectral distribution measuring device, by disposing the diffraction unit such that the direction where the diffraction image of the reflection light from each measuring area expands on the light-receiving face inclines at a predetermined angle to the direction where the light-receiving face expands, the irradiated area corresponding to the measuring wavelength range of each predetermined order diffraction light except for zero order diffraction light can be only irradiated on each corresponding spectral light-irradiated area. Therefore, the colors of the measuring object can be measured with high accuracy even if a simple configuration is used.

According to the above-described spectral distribution measuring device, by dividing the spectral light-irradiated area into the measurement area which is used for spectral measurement and the non-measurement area which is not used for spectral measurement, the non-measurement area which is not used for the spectral measurement is formed between the measurement areas next to each other. By this configuration, the diffraction image except for a predetermined diffraction image formed on each spectral light irradiated area is formed in a position away from the measurement area, so that the colors of the measuring object can be measured with high accuracy.

According to the above-described spectral distribution measuring device, the wavelength controller configured to control from 400 nm-700 nm the wavelength range of each diffraction image to be focused on the light receiving face of the light receiving section is provided in the optical path from the illumination unit to the linear image sensor. Thereby, a predetermined order diffraction image formed on each spectral light-irradiated area does not overlap with a predetermined order diffraction image next to that diffraction image, so that the colors of the measuring object can be measured with high accuracy.

According to the above-described spectral distribution measuring device, the diffraction unit in which diffraction efficiency to a specific diffraction order is improved in a predetermined wavelength within a visible light range is used, and the diffraction image having an order in which the diffraction efficiency is improved by the diffraction unit being formed on each spectral light-irradiated area. By this configuration, the spectral distribution can be measured by effectively using the diffuse reflection light from the measuring object, so that the colors of the measuring object can be measured with high accuracy.

According to the above-described spectral distribution measuring device, the focusing optical system is provided between the slit array and the diffraction unit, and the astigmatism adder configured to adjust a length of each diffraction image in the direction orthogonal to the direction where the light receiving face expands on the light receiving face of each diffraction image is provided in an optical path from the illumination unit to the linear image sensor. Thereby, this length can be measured independently of the length in the direction where the light receiving face expands on the light receiving face, so that the colors can be measured with high accuracy.

According to the above-described spectral distribution measuring device, the astigmatism adder is the achromatic lens. Consequently, by removing the chromatic aberration, the variation in colors caused by chromatic aberration generating in a predetermined diffraction image formed on each spectral light irradiated area can be controlled, so that the colors of the measuring object can be measured with high accuracy.

What is claimed is:

1. A spectral distribution measuring device, comprising:
   a plurality of areas being measured which is set on a surface of an object being measured, and reflects light irradiated by an illumination unit to a plurality of slits;
   a diffraction unit configured to diffract reflection light which is reflected from the areas being measured and has passed through each slit; and
   an image sensor including a light receiving face and a plurality of spectral light-irradiated areas, the imaging sensor being configured to receive the light diffracted by the diffraction unit,
   wherein each spectral light-irradiated area includes a measurement area which is used in spectral measurement and a non-measurement area which is not used in spectral measurement.

2. The spectral distribution measuring device according to claim 1, wherein where a length of each diffraction image in the direction orthogonal to the direction where the light receiving face expands on the light receiving face is h, a number of pixels constituting the measurement area out of a plurality of pixels constituting each spectral light irradiated area is m, as a square pixel, a length of one side of the pixel is p, and the predetermined angle is $\theta$, these satisfy the following condition: $h > m \times p \times \tan\theta + p$.

3. The spectral distribution measuring device according to claim 1, wherein where a number of pixels constituting the non-measurement area out of a plurality of pixels constituting each spectral light-irradiated area is n, where n satisfies the following condition, $n \geq 1/\tan\theta$, and a setting interval of each slit on the slit array and a positional relationship among the object being measured, the slit array, a focusing optical system and the image sensor are set such that a length in a direction where each spectral light-irradiated area expands on the light receiving face becomes $(m+n) \times p$.

4. The spectral distribution measuring device according to claim 1, wherein an optical path from the illumination unit to the image sensor has a wavelength controller configured to control a wavelength range of passing light from 400 nm-700 nm.

5. The spectral distribution measuring device according to claim 1, wherein the diffraction unit includes a blazed diffraction grating which improves diffraction efficiency to a first order diffraction image in a wavelength range of 400 nm 700 nm.

6. The spectral distribution measuring device according to claim 1, wherein a focusing optical system is provided between the slit array and the diffraction unit, and an astigmatism adder configured to adjust a length of each diffraction image in the direction orthogonal to the direction where the light receiving face expands on the light receiving face is provided in an optical path from the illumination unit to the image sensor.

7. The spectral distribution measuring device according to claim 6, wherein the astigmatism adder is a cylindrical lens.

8. The spectral distribution measuring device according to claim 7, wherein the astigmatism adder is an achromatic lens.

9. The spectral measuring device according to claim 1, further comprising a slit array located between the plurality of areas being measured and the diffraction unit, and wherein the slit array includes the plurality of slits.

10. The spectral measuring device according to claim 9, further comprising the illumination unit.

11. The spectral measuring device according to claim 10, wherein the illumination unit is configured to illuminate white light.

12. The spectral measuring device according to claim 11, wherein the diffraction unit is configured to disperse the reflection light.

13. The spectral measuring device according to claim 12, wherein the image sensor includes a linear image sensor.

* * * * *